(No Model.)
G. M. KIM.
HOSE CARRIAGE.
No. 429,764. Patented June 10, 1890.
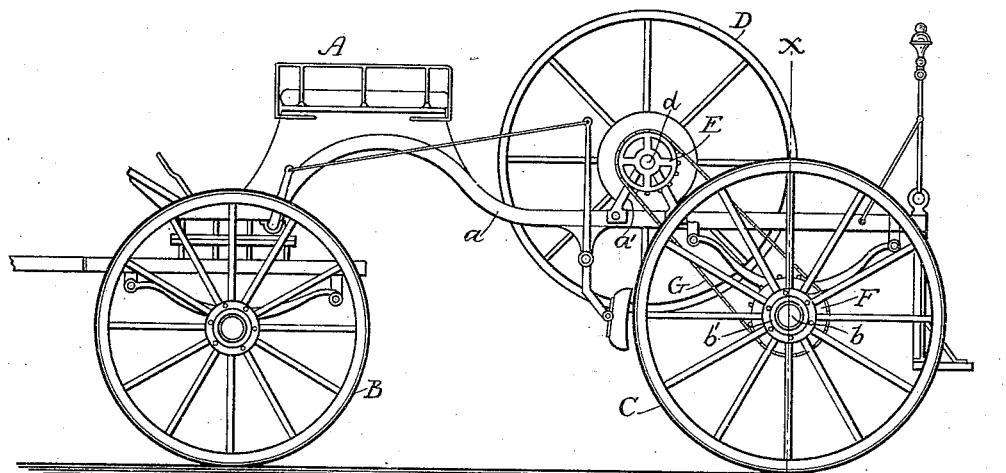
Fig. 1.
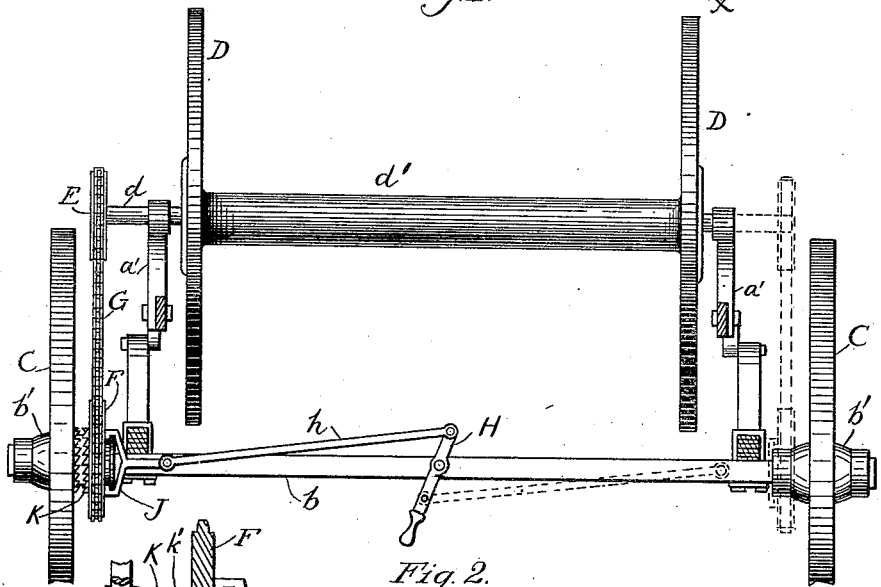
Fig. 2.
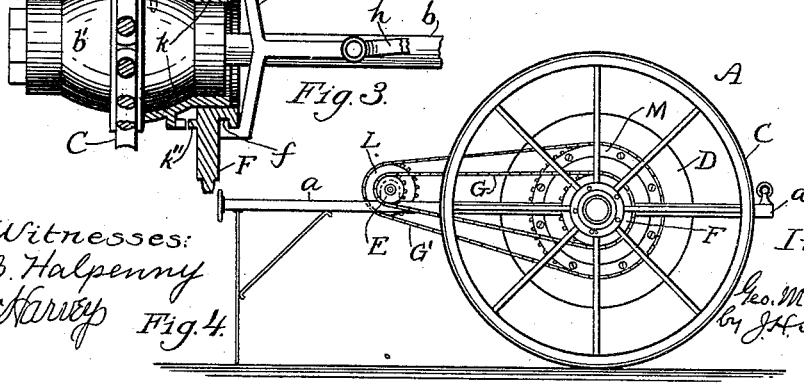
Fig. 3.
Witnesses:
J. B. Halpenny
John Harvey
Fig. 4.
Inventor:
Geo. Martin Kim
by J. H. Stevenson
Atty.

UNITED STATES PATENT OFFICE.

GEORGE MARTIN KIM, OF ALLEGHENY, PENNSYLVANIA.

HOSE-CARRIAGE.

SPECIFICATION forming part of Letters Patent No. 429,764, dated June 10, 1890.

Application filed August 22, 1889. Renewed April 23, 1890. Serial No. 349,061. (No model.)

*To all whom it may concern:*

Be it known that I, GEORGE MARTIN KIM, of Allegheny, Pennsylvania, have invented a new and useful Improvement in Hose-Carriages for Fire Departments, which improvement is fully set forth in the following specification, reference being had to the accompanying drawings.

The object of my invention is a hose-carriage for fire departments, the main feature of which is the device for reeling the hose, which will be more particularly described hereinafter.

In the drawings, Figure 1 is a full-length side view of a hose-carriage with my device attached. Fig. 2 is an end view of the same. Fig. 3 is a sectional view of the clutch on the carriage hub and axle, and Fig. 4 is a side view of my hose-reeling device as attached to a cart.

Similar letters of reference indicate corresponding parts.

In the drawings, A represents a seat; $a$, the frame-work of the carriage.

$a'$ $a'$ are housings on the axle $b$ and bearing the shaft $d$.

B is the front wheel of the carriage.

C is the hind wheel of the carriage.

$b'$ is the hub.

D is the hose-spool.

$d'$ is the spool-cylinder.

E is a chain-belt pulley fixed to the shaft $d$, and F is another pulley fixed to the hub. Over these two pulleys E and F passes the chain belt G.

H is a lever fulcrumed to the axle $b$. To this lever is attached a rod $h$.

J is the clutch.

K is the crab. On the movable crab K is the pulley F. The clutch device is in two sections, one section $k''$ being movable, and the other section $k$ being rigidly fixed to the hub $b'$. The movement of this clutch device is effected through the medium of the lever H, rod $h$, and clutch J. By this means the two sections can be engaged and disengaged at will. It will readily be seen that when the carriage is moving forward and the two sections of the clutch or crab are engaged at once the reel is made to revolve, thus reeling up the hose at will. The lever H operates the clutch and crab at each hub at the same time, the rod $h$ and all the other parts being the same on both sides and are worked by the same movement.

The pulley-wheels E and F and chain belt G are the same on both sides of the carriage.

The crab K will be a casting, and will be secured to the hub $b'$ by screws or bolts. On this casting will be "catches" made in the usual form, and will be made to correspond with the catches on the movable pulley F.

Fig. 4 of the accompanying drawings shows my device for a hose-reel for a two-wheeled vehicle, wherein $a$ $a$ show the frame-work of the cart. C is the wheel. D is the spool. F is the pulley, and is constructed and secured the same as shown in Figs. 2 and 3. G is a chain belt on pulleys F and E. L and M are also pulley-wheels for the chain belt G', the wheel M being securely fixed to the spool by means of bolts or screws. The working of the reel on the cart is about the same as shown in Fig. 2, a lever, rod, clutch, &c., being used.

In the operation of the reel on the cart power is transmitted from the pulley F, Fig. 4, to pulley E, and from there to the spool D by means of belt G' on pulleys L and M, the pulleys L and E being on the same shaft.

Having thus described my invention, what I claim, and desire to secure by Letters Patent, is—

In a hose-carriage, the combination, with a frame, a reel, and the axle carrying the wheels, of a hollow annular casting K, fitted snugly over the hub of the wheel on the inner side thereof and rigidly secured to the same, as described, a sliding sprocket-wheel F fitted on a cylindrical part or end of said casting, the clutch sections or teeth $k'$ $k''$, formed on opposing faces of the casting and the sprocket-wheel, an operating-lever H, fulcrumed on the axle, a rod intermediate of the lever and sliding sprocket-wheel F and having the fork J, which engages an annular flange on said wheel F, another sprocket-wheel E, secured to the reel, and a sprocket-chain intermediate of the wheels E F, all combined and arranged substantially as described, for the purpose set forth.

In testimony that I claim the foregoing as my invention I hereto set my hand in presence of two witnesses.

GEORGE MARTIN KIM.

Witnesses:
JOHN HARVEY,
REUBEN WATT.